July 9, 1929.  F. P. SCOTT  1,720,355
MIXER ASSEMBLY
Filed March 15, 1928

INVENTOR
Frank P. Scott
John A. Naismith
ATTORNEY

Patented July 9, 1929.

1,720,355

UNITED STATES PATENT OFFICE.

FRANK P. SCOTT, OF SAN JOSE, CALIFORNIA.

MIXER ASSEMBLY.

Application filed March 15, 1928. Serial No. 261,982.

This invention relates particularly to that type of mixer used in the preparation of various kinds of soft drinks such as milk shakes and similar drinks.

It is customary under existing conditions to place the ingredients of the drink in a suitable container and then mount the container on a stand in such a manner that a spindle carried by a motor mounted on the stand is positioned within the container. When the motor is in operation the spindle is rotated at high speed and the ingredients in the container are thoroughly mixed. These devices are provided complete in single units, a single spindle being operated by each motor. In most places where soft drinks are served a number of these devices are used, each additional device requiring the purchasing of a complete stand, electrical motor and connections and spindle.

It is the object of the present invention to provide a device of the character indicated whereby a plurality of spindles may be operated by a single motor, thereby obviating the necessity of purchasing a motor with connections with every spindle used.

It is also an object of the invention to provide an assembly that is simple in construction, economical to manufacture, and highly efficient in its practical application.

Figure 1:
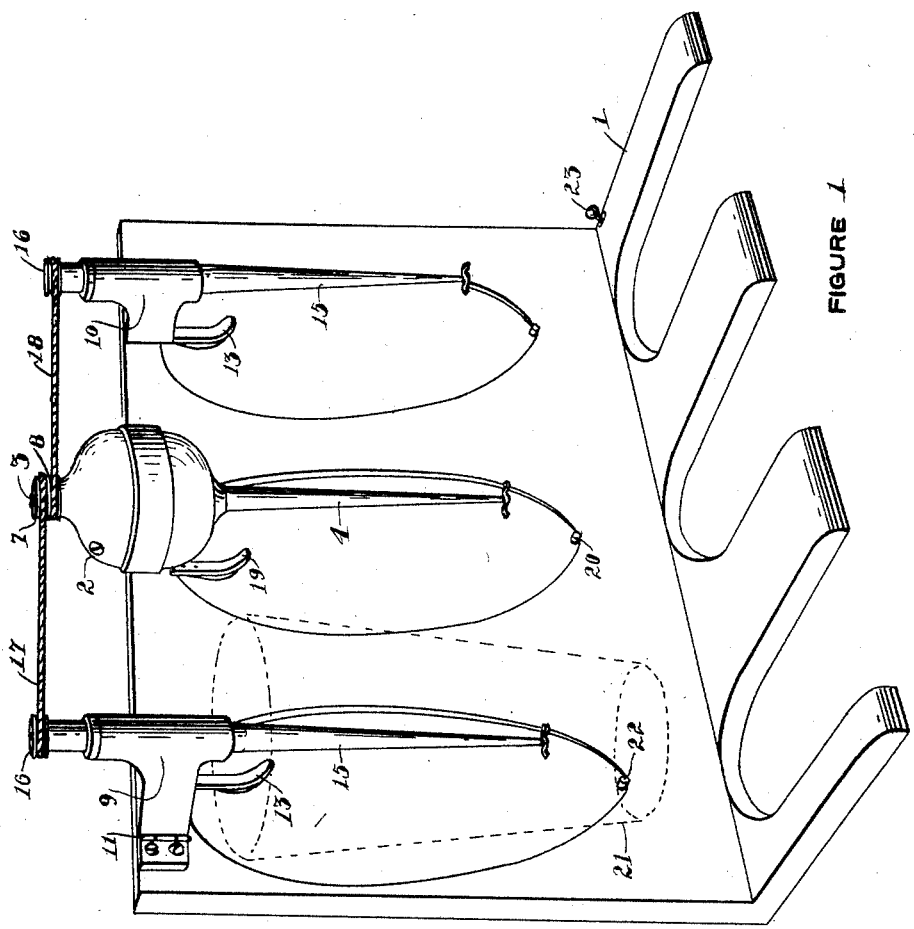
Figure 1 is a perspective illustration of a mixer assembly in accordance with my invention.
Figure 2:
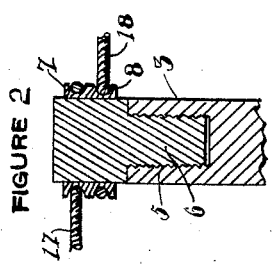
Figure 2 is an enlarged sectional detail showing the method of mounting the pulleys upon the motor shaft.
Figure 3:
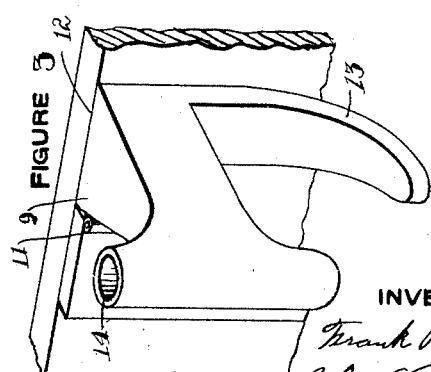
Figure 3 is an enlarged perspective detail of one of the spindle supports.

Referring now more particularly to the drawing, I show at 1 a suitable standard. On the back of this standard and near the center thereof is mounted an electrical motor 2 with its shaft 3 in a vertical position and carrying a mixing spindle 4. This motor is connected to an electrical circuit in any suitable manner and, of course, is provided with a suitable switch, shown at 23.

The upper end of the shaft 3 is tapped as at 5 to receive an element 6 carrying pulleys 7 and 8.

At 9 and 10 are shown bearing members spaced a distance on either side of motor 2 and hingedly mounted on the back of the standard as at 11. Each of these members 9 and 10 has a part as 12 adapted to bear against the back of the standard and provided with a downwardly and forwardly projecting finger 13. In each member is formed a vertical bearing 14 in which is revolubly mounted a spindle 15 similar to the first mentioned mixing spindle 4. On the upper end of each of these two spindles 15 is mounted a pulley as 16, one pulley 16 being connected to pulley 7 by a belt 17, and the other pulley 16 being connected to the pulley 8 by a belt 18.

When the motor 2 is in operation a container may be placed in an operative position relative thereto by inserting its upper edge under spring 19 and resting its lower edge on button 20.

Even when the motor 2 is in operation the two spindles 15 are normally inoperative because the belts 17 and 18 are slack. If, however a container as 21 is placed in position with its upper edge under the finger 13 and resting upon a button 22, then the bearing member is moved slightly upon its hinge 11 and the belt tightened so that the spindle 15 is rotated at high speed. The moment the container is removed the belt becomes slack and the spindle ceases to rotate.

It may now be readily seen from the foregoing description that I have provided an assembly whereby a number of mixing spindles may be operated by a single motor, each spindle being operated only when in use.

It is to be understood, of course, that while I have herein shown and described but one specific embodiment of the invention, changes in form, construction, and method of assembly and operation may be made within the scope of the appended claims.

I claim:

1. A device of the character described, comprising a standard, a vertically positioned electric motor operatively mounted thereon and provided with a mixing spindle depending therefrom, an extension mounted upon the upper end of the motor shaft, a pulley mounted upon the said extension, a bearing member mounted upon the standard adjacent the motor, a vertically positioned spindle mounted to rotate therein and having a pulley mounted upon its upper end, and a belt connecting the two pulleys.

2. A device of the character described, comprising a standard, an electric motor operatively mounted thereon and provided with a mixing spindle, a vertically positioned mixing spindle revolubly mounted on the standard adjacent the motor and adjustable relative thereto, and driving means connecting the motor and second spindle.

3. A device of the character described, comprising a standard, an electric motor operatively mounted thereon and with a vertical shaft, a pulley mounted on the shaft, a bearing member swingably mounted adjacent the motor, a spindle revolubly mounted in the bearing member in parallel relation to the motor shaft, a pulley on the spindle, and a belt connecting the pulleys.

4. A device of the character described, comprising a motor fixedly mounted on a vertical axis, a spindle revolubly mounted adjacent the motor and in parallel relation to the motor axis and movable toward and away from the said motor, and a belt connecting the spindle and motor shaft and rendered operative by movement of the spindle away from the motor.

5. A device of the character described, comprising a support, a vertically positioned motor mounted thereon having a rotor shaft extending upwardly from the motor, a pulley on the shaft, a bearing member hingedly mounted on the support and normally bearing thereagainst, a spindle revolubly mounted in the bearing member in parallel relation to the rotor shaft, a pulley on the spindle, and a belt connecting the pulleys and tensioned by movement of the bearing member away from the support.

FRANK P. SCOTT.